United States Patent [19]

Franz et al.

[11] Patent Number: 5,660,209

[45] Date of Patent: Aug. 26, 1997

[54] POROUS PIPE AND PROCESS FOR PRODUCING SAME

[75] Inventors: James J. Franz, Monarch Beach, Calif.; Richard A. Hutchinson, San Antonio, Tex.

[73] Assignee: Subsurface Technology Corp., Dana Point, Calif.

[21] Appl. No.: 509,101

[22] Filed: Aug. 1, 1995

Related U.S. Application Data

[62] Division of Ser. No. 216,641, Mar. 23, 1994, Pat. No. 5,462,092, which is a division of Ser. No. 896,510, Jun. 8, 1992, Pat. No. 5,334,336, which is a continuation of Ser. No. 368,240, Jun. 19, 1989, abandoned.

[51] Int. Cl.⁶ .................................................. F16L 11/08
[52] U.S. Cl. .................... 138/103; 138/DIG. 9; 138/177; 239/145
[58] Field of Search ................... 138/103, DIG. 9, 138/DIG. 8, 177, 178, 108, 118; 239/145; 405/43, 45

[56] References Cited

U.S. PATENT DOCUMENTS

| | | |
|---|---|---|
| 2,303,629 | 12/1942 | Gelinas ........................ 138/103 X |
| 2,722,237 | 11/1955 | Rosel ........................... 138/103 X |
| 2,723,934 | 11/1955 | Morris et al. . |
| 2,782,251 | 2/1957 | Ebel et al. ................... 138/DIG. 9 |
| 2,911,382 | 11/1959 | Barkhuff et al. . |
| 3,119,415 | 1/1964 | Galloway et al. ............ 138/103 |
| 3,289,703 | 12/1966 | Brown ....................... 138/DIG. 9 X |
| 3,774,648 | 11/1973 | Edlin . |
| 3,922,328 | 11/1975 | Johnson . |
| 3,928,521 | 12/1975 | Haren et al. . |
| 3,935,632 | 2/1976 | Maxson ...................... 138/DIG. 9 |
| 3,936,335 | 2/1976 | Martuch ..................... 138/DIG. 9 |
| 4,003,408 | 1/1977 | Turner ........................ 138/103 X |
| 4,049,760 | 9/1977 | Lozach . |
| 4,110,420 | 8/1978 | Turner . |
| 4,168,799 | 9/1979 | Turner . |
| 4,235,561 | 11/1980 | Peterson . |
| 4,393,901 | 7/1983 | Beck .......................... 138/DIG. 9 |
| 4,438,223 | 3/1984 | Hunter . |
| 4,517,316 | 5/1985 | Mason . |
| 4,553,923 | 11/1985 | Lupke . |
| 4,559,367 | 12/1985 | Hurps et al. . |
| 4,576,846 | 3/1986 | Noel ....................... 138/DIG. 9 X |
| 4,600,146 | 7/1986 | Ohno ......................... 138/103 X |
| 4,615,642 | 10/1986 | Mason . |
| 4,616,055 | 10/1986 | Mason . |
| 4,652,590 | 3/1987 | Hoki et al. . |
| 4,657,715 | 4/1987 | Myers et al. . |
| 4,721,408 | 1/1988 | Hewlett . |
| 4,798,230 | 1/1989 | Hopperdietzel .................. 138/103 |

FOREIGN PATENT DOCUMENTS 2177584  12/1973  France .

*Primary Examiner*—Patrick Brinson
*Attorney, Agent, or Firm*—Frank J. Uxa

[57] ABSTRACT

A process for producing a porous pipe is disclosed and comprises forming an extrudable mixture comprising elastomer particles, binder component and a solid water carrier component having a composition other than the elastomer particles and the binder component and being associated with sufficient water to provide porosity to a porous pipe produced from the mixture; and extruding the extrudable mixture to conditions effective to form the porous pipe.

13 Claims, 2 Drawing Sheets

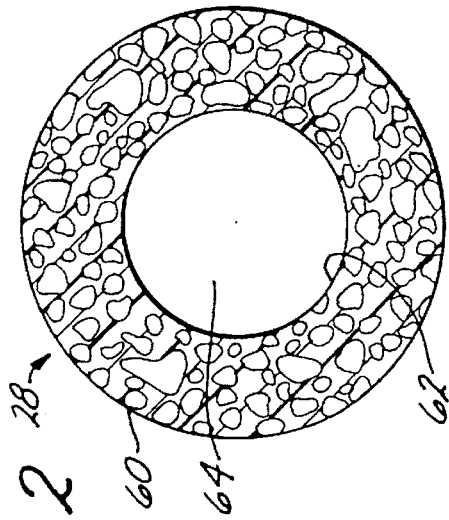
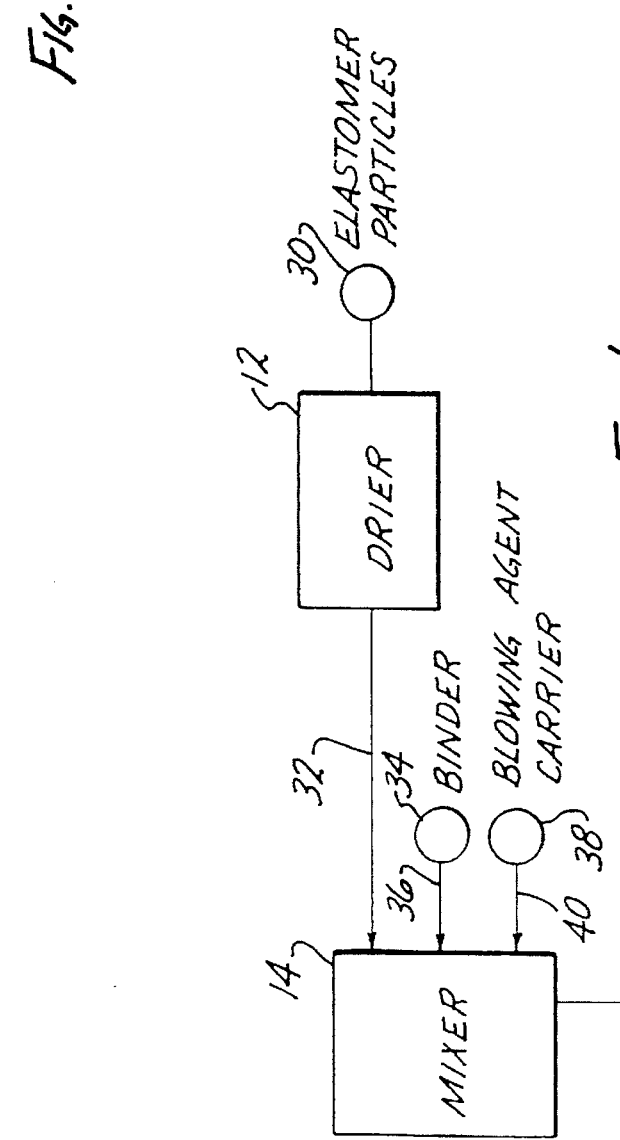
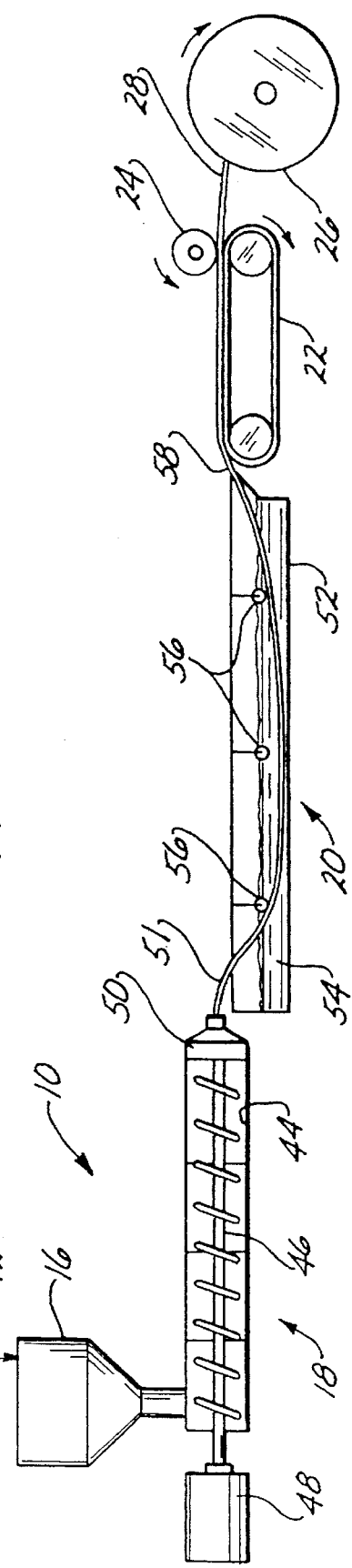

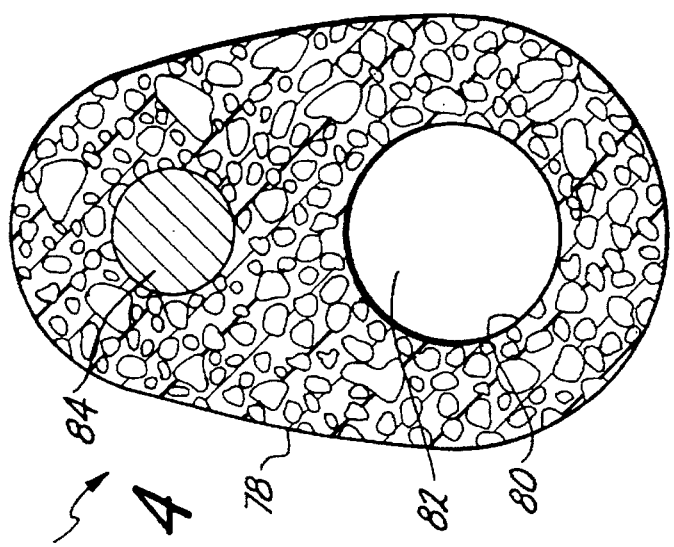
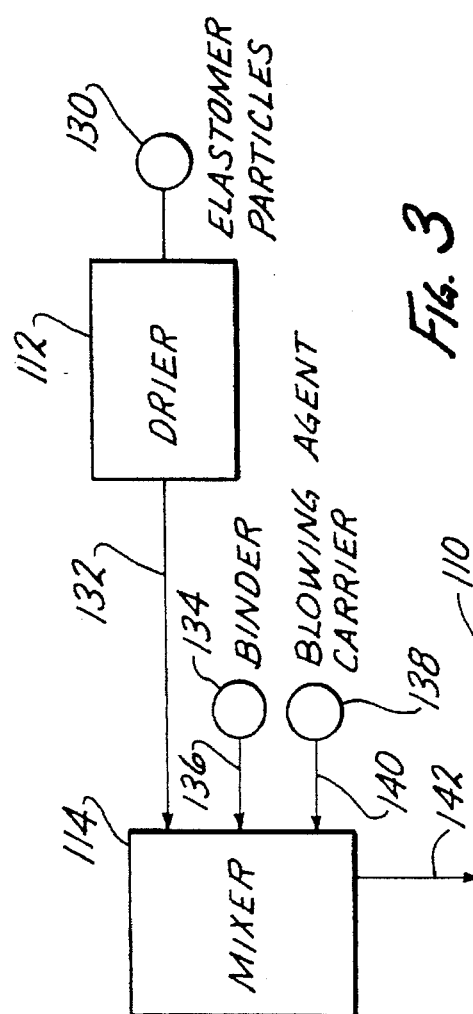
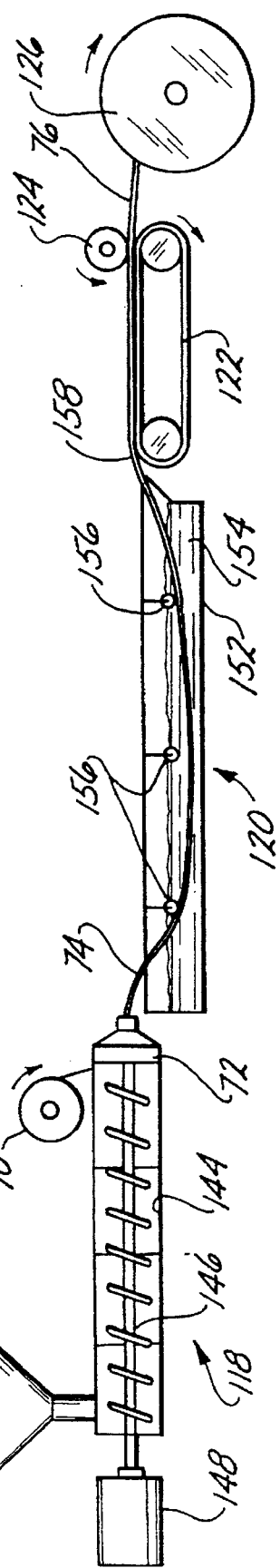

POROUS PIPE AND PROCESS FOR PRODUCING SAME

This application is a division of application Ser. No. 08/216,641, filed Mar. 23, 1994, now U.S. Pat. No. 5,462,092 which, in turn, is a division of application Ser. No. 07/896,510 filed Jun. 8, 1992, now U.S. Pat. No. 5,334,336, which in turn is a continuation of application Ser. No. 07/368,240 filed Jun. 19, 1989, now abandoned.

This invention relates to porous articles, in particular porous pipe, and to a process for producing porous articles. More particularly, the invention relates to porous pipes and processes for producing same which provide effective, reliable and relatively easy control of the porosity of the pipes.

Porous pipe has been suggested for use in irrigation systems. See, for example Turner U.S. Pat. Nos. 4,003,408, 4,110,420 and U.S. Pat. No. 4,168,799. Such porous pipe has been produced by extruding a mixture of crumb rubber particles and binder into a pipe. The water contained in the crumb rubber particles vaporized during the extrusion process and, in so doing, played a role in producing the porosity of the porous pipe. The crumb rubber used is often derived from various sources with variable moisture content and/or is often stored under variable humidity conditions and, thus, does not have a controlled water content. Thus, the porosity of the pipe produced in accordance with the Turner patents often has varying porosities. Attempts by Turner to control the moisture content of the crumb rubber, e.g., by venting the extruder, proved unsuccessful.

It would be advantageous to provide a porous pipe having a substantially uniform porosity over its length. Further, it would be advantageous to provide a porous pipe having a controlled amount of porosity along its length.

Mason U.S. Pat. No. 4,616,055 disclosed an approach to providing porous pipe with substantially uniform porosity. This approach involves drying the mixture of elastomer particles and binder to a predetermined, finite water content, such as 0.75% by weight of water, prior to extruding the mixture. However, it is quite difficult to reliably dry a material to a predetermined finite water concentration, particularly when the water content of the starting materials, e.g., crumb rubber particles, continuously varies.

Clearly, another approach to controlling the porosity of porous pipe would be advantageous.

SUMMARY OF THE INVENTION

A new porous article, in particular porous pipe, and a new process for producing porous articles have been discovered. The present process provides for effective, reliable and relatively easy control of the porosity of the porous article. The present process involves positively controlling the amount of blowing agent, especially water, in the elastomer particles/binder mixture to be extruded into the porous article. No reliance is placed on the residual moisture present in the feed materials, in particular the crumb rubber particles, to assist in forming the pores in the porous article. A separate, controlled source of blowing agent is used. This positive control of the amount of blowing agent in the extrudable mixture provides a porous article having a controlled, preferably substantially uniform, degree of porosity throughout, e.g., along the length of the porous pipe.

Although other blowing agents may be employed in the present invention, water, because of its nature, availability and effectiveness, is by far preferred. Therefore, in describing the present invention, water is, in most instances, indicated as being the blowing agent. However, it should be understood that one or more other blowing agents may be substituted for all or at least a portion of the water.

In one embodiment, the porous article producing process of the present invention comprises forming an extrudable mixture comprising elastomer, preferably vulcanized elastomer, particles; binder component; and a solid water (blowing agent) carrier component. This solid component preferably has a composition other than that of the elastomer particles or the binder component. Thus, the solid water carrier component is preferably not part of either the elastomer particles or the binder component. This solid component, preferably a hydrophilic solid component, is associated with sufficient water (blowing agent) to provide porosity, e.g., the desired degree of porosity, to the porous article, e.g., pipe, produced from the mixture. This extrudable mixture is extruded at conditions effective to form the porous article, e.g., pipe. Such extrusion conditions are preferably effective to cause water (blowing agent) to dissociate from the solid component. It is particularly useful to control the amount of water (blowing agent) associated with the solid component in the extrudable mixture so as to control the porosity of the porous article. This can be done (1) by adjusting the amount of solid component (including a constant concentration of associated water (blowing agent) in the extrudable mixture and/or (2) by varying the concentration of water (blowing agent) associated with a given amount of solid component in the extrudable mixture. Preferably, at least a major amount, more preferably at least about 70% and still more preferably substantially all, of the water (blowing agent) is adsorbed onto or otherwise combined into the solid component. The use of combined water (blowing agent) is very effective since it is held by the solid component, and is not released unevenly to the elastomer particles, in the extrudable mixture.

The amount of water associated with the solid component is such as to provide the desired amount of porosity to the final porous article product. This amount of water is preferably in the range of about 0.05% to about 1%, more preferably about 0.1% to about 0.5% by weight of the total extrudable mixture.

The solid component may be organic or inorganic in nature. The solid component may be porous more preferably having pores of sufficient size to adsorb or otherwise associate water therein. Examples of the solid components include molecular sieves, in particular zeolitic molecular sieves; crystalline and amorphous inorganic oxides; clays; organic polymeric materials, for example, synthetic ion exchange resins; vermiculite; diatomaceous earth and mixtures thereof. Particularly useful solid water carrier components are those selected from the group consisting of synthetic molecular sieves, in particular synthetic zeolitic molecular sieves; synthetic ion exchange resins and mixtures thereof. Specific examples of solid water carrier components include synthetic ion exchange resins comprising styrene (polystyrene)/divinyl benzene copolymers such as, for example, such copolymers which include functional sulfonic acid groups. The ion exchange resins may be used, for example, in the alkali metal, e.g., sodium, form or in the hydrogen form. The solid water carrier component may be a resin comprising a styrene/p-divinyl benzene copolymer, such as those sold by Rohm and Haas under the trademarks Amberlite IR-120 Plus and Amberlite IR-120 Plus (H).

The amount of solid component present in the extrudable mixture is preferably relatively minor in comparison to the amount of elastomer particles and binder component present. More preferably, the amount of solid component is less than about 5%, still more preferably less than about 2%, by weight of the total extrudable mixture. The solid component is preferably in the form of particles having a size or sizes which are suitable to form an intimate admixture, more preferably a substantially uniform intimate admixture, with the remainder of the extrudable mixture. Solid component particles having a maximum transverse dimension, e.g., diameter, in the range of about 10 microns to about 0.25 inches, may be employed in many applications.

The elastomer particles useful in the present invention are preferably made of one or more materials which allow such particles to remain intact throughout the present porous article production process. The elastomer particles are preferably derived from vulcanized material. The elastomer particles may be of any suitable size sufficient to meet the requirements of the application involved. Such particles are preferably of a size to pass through a U.S. screen in the range of about 10 mesh to about 80 mesh. The amount of elastomer particles present is preferably in the range of about 30% to about 90% by weight of the extrudable mixture. The elastomer particles more preferably comprise a major amount, i.e., more than about 50%, by weight of the extrudable mixture. In situations where the elastomer particles, such as crumb rubber materials, include a significant amount of residual moisture as received, it is preferred to dry the elastomer particles e.g., at least a portion, preferably a major portion (i.e., more than about 50%) and more preferably substantially all of the elastomer particles, before combining them with the solid component. It is particularly useful to dry the elastomer particles so that they are substantially anhydrous. That is, the elastomer particles are preferably dried so as to contain insufficient moisture to provide for any substantial porosity in the final porous article product.

The binder component acts or functions to bind or hold together the final porous article product. The binder component is preferably present in an amount in the range of about 10% to about 70% by weight of the extrudable mixture. More preferably, the binder component is present in a minor amount, i.e., less than about 50%, by weight. The binder component preferably plasticizes or becomes molten at conditions within the extruder. One particularly useful class of binder components is the thermoplastic polymeric materials. More preferably, the binder component is selected from the group consisting of polyolefins, especially polyethylenes. The binder component is preferably present in the form of particles of a size capable of forming an intimate admixture, more preferably a substantially uniform intimate admixture, with the remainder of the extrudable mixture, e.g., before the mixture is fed to the extruder. For example, the particle size of the binder component may be in the same size range as the elastomer particles. The binder component is preferably present as particles having a maximum transverse dimension, e.g., diameter, in the range of about 0.1 inch to about 0.5 inch.

In another embodiment, the extruding step preferably occurs so that the porous article leaving the extruder is cooled, for example in a chilled water bath at a temperature in the range of about 35° F. to about 50° F. A particularly useful embodiment involves allowing the porous article to leave the extruder without the application of any substantial amount of tension on the porous article pulling the porous article from the extruder die. It has been found that providing for substantially no tension allows for substantially uniform porosity in the final porous article product.

The porous article products produced in accordance with the present process have substantially advantageous and unique properties.

In one embodiment, the extruded porous article of the present invention comprises a porous composite containing elastomer particles, binder component and a solid component having a composition other than that of either the elastomer particles or the binder component. The porosity of the porous composite is at least partially controlled by the amount of water disassociated from the solid component in the process of manufacturing the extruded porous article.

In one embodiment the article may be such that the porous composite is in the form of a sheet rather then a pipe or tube.

One additional broad aspect of the present invention involves an article comprising a porous pipe having a length, a longitudinally extending open space and a porous wall containing elastomer particles and binder component. A ballast means is provided and acts to increase the weight of the article relative to a similar article without the ballast means. This ballast means, as with all of the present porous articles, is preferably flexible. The ballast means is preferably a metallic rod, more preferably a lead rod or wire. The ballast means is preferably located at least partially, more preferably substantially totally, within the porous wall of the article. In a particularly useful embodiment the ballast means containing article is produced in accordance with the process described herein for producing porous pipe and is produced utilizing the extrudable mixture described herein.

Such article comprising a porous pipe with a ballast means is particularly useful for aeration applications where the porous pipe is to be submerged in a liquid, such as water. The ballast means acts to maintain the porous pipe at the desired level within the liquid. In a particularly useful embodiment, the ballast means is coated with a protective material to inhibit the contamination of the liquid by the ballast means.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a schematic view illustrating one embodiment of the present system for producing porous pipe.

FIG. 2 is a cross-sectional view showing the porous pipe produced by the system of FIG. 1.

FIG. 3 is a schematic view illustrating another embodiment of the present system for producing porous pipe.

FIG. 4 is a cross-sectional view showing the porous pipe produced by the system of FIG. 3.

DETAILED DESCRIPTION OF THE DRAWINGS

Referring now to the drawings, FIG. 1 illustrates a porous pipe producing system, shown generally at 10, which includes a drier 12, a mixer 14, a feed hopper 16, and extruder assembly 18, a cooler assembly 20, a conveyor belt 22, a nip roller 24 and a spool 26. System 10 functions, as described hereinafter, to produce a porous pipe 28, shown in FIGS. 1 and 2.

Drier 12, which may be of any, e.g., conventional, type and design suitable to perform as set forth herein, is adapted and functions to remove residual water from, or dry, the elastomer particles from source 30 and to produce substantially anhydrous elastomer particles. The highest temperature at which this drying takes place in drier 12 is preferably greater than any temperature to which the elastomer particles are exposed to in the extruder assembly 18. This is advantageous since any trace of moisture which might remain in the substantially anhydrous elastomer particles after drying tends to remain with the particles rather than being vaporized as the porous pipe exits the extruder assembly 18. Thus, with a higher temperature in drier 12 relative to the temperature in extruder assembly 18, the water, if any, remaining in the substantially anhydrous elastomer particles from drier 12 does not significantly influence the porosity of the porous pipe 28. The use of substantially anhydrous elastomer particles, particularly when, as is preferred, substantially no tension force is exerted to pull the porous pipe from the extruder die, has also been found to reduce, and even eliminate, the need for other separate components, e.g., lubricants, slip agents, strengthening agents and the like. The present porous products and extrudable mixtures preferably have substantially no separate lubricants and/or slip agents.

The elastomer particles may be chosen from among any suitable material provided that such particles remain substantially intact as they are processed into the porous pipe 28. In other words, such particles, or at least a major portion of such particles, should be identifiable as such in the final porous pipe product. Examples of materials from which the elastomer particles can be derived include natural rubber, synthetic rubbers, and mixtures thereof. Examples of synthetic rubbers include homopolymers of butadiene and isoprene and their copolymers with minor amounts of vinyl monomers, such as styrene, isobutylene, acrylonitrile and mixtures thereof. It is preferred that the elastomer particles by vulcanized in order to maintain their integrity through the system 10. One particularly useful source of the elastomer particles is the rubber reclaimed from vehicular, e.g. automobile, tires after removal of the metal tire cords and metal reinforcement material. The elastomer particles may be ground into particles, preferably no larger than those passing through a 10 mesh (U.S.) screen and more preferably no larger than particles passing through a 20 mesh (U.S.) screen, and still more preferably no larger than particles passing through a 60 mesh (U.S.) screen.

The substantially anhydrous elastomer particles from drier 12 are passed to mixer 14 via line 32. A binder from source 34 is also introduced into mixer 14 via line 36. Further, a solid blowing agent-containing carrier from source 38 is introduced into mixer 14 via line 40. These components are thoroughly mixed to form a substantially uniform mixture which exits mixer 14 via line 42 into feed hopper 16.

The binder used may be selected from any suitable, e.g. conventional polymeric, material which becomes molten or at least is plasticized at the conditions existing in extruder assembly 18. Particularly useful binders include one or more thermoplastic polymeric resins. The binder, as well as other components present in porous pipe 28, is preferably stable to long term exposure to soil environment, and to fertilizers, herbicides or pesticides seeping into adjacent soil or to fertilizers, growth regulators, herbicides or pesticides dispensed by dissolving in the irrigation water. None of such components should have any substantial deleterious affect or interaction on or with the other components in the porous pipe 28 during or after production of porous pipe 28. Styrene polymers, including impact polystyrene copolymers, are useful. In addition, linear polyamides, such as various nylons, polyvinyl chloride, polypheneylene oxide and polypheneylene sulfide polymers are useful.

A more preferred group of binder materials are polymers of alkenes having two to about four carbon atoms per molecule, such as polyethylenes, polypropylenes, polybutenes and mixtures thereof. These polymers are unreactive in soil and in the extruder assembly 18. Polyethylenes having lower melting temperatures are tougher and hold their shape better. High density polyethylenes, e.g., having densities in the range of about 0.94 to about 0.97 gm/cc, and porous pipe prepared with all high density polyethylene binder may be somewhat stiff, brittle and difficult to extrude. Low density polyethylene, e.g. having densities in the range or about 0.90 to about 0.93 gm/cc, and porous pipe prepared with all low density polyethylene are very flexible and can readily be bent to follow a desired path and are readily extruded. The binder may contain a combination of high density polyethylene, preferably in the range of about 50% to about 80% by weight, more preferably about 60% to about 70% by weight, of the total binder, and low density polyethylene, preferably in the range of 20% to about 50% by weight, more preferably about 30% to about 40% by weight, of the total binder.

The binder introduced into mixer 14 can be in any form, preferably as particles such as powder, flake, pellets and the like. Reclaimed binder materials can also be used. The form of the binder is preferably such that a substantially uniform mixture of the binder, substantially anhydrous elastomer particles and blowing agent-containing carrier can be produced in mixer 14. The binder may include one or more other components which act as blowing agents in the present process. However, the effect of these components on the porosity of the porous pipe 28 is minor relative to the effect of the blowing agent in the solid blowing agent-containing carrier. In addition, the amount of such blowing agent acting components in the binder is often substantially constant and predictable. Thus, the effect on the porosity of the porous pipe 28 of these components can be taken into account by adjusting the amount of blowing agent associated with the solid carrier in the extrudable mixture.

An important feature of the present invention is the use of a solid blowing agent-containing carrier. It has been found hat the use of such a solid blowing agent-containing carrier provides for improved control of the porosity of the final porous pipe 28 which, in turn, leads to a more uniform and desirable product.

As used herein, the term "blowing agent" refers to any substance which vaporizes at conditions present in the extruder assembly 18 to provide, or at least facilitate providing, pores in the porous pipe 28. The blowing agent utilized should have no substantial detrimental effect on the other components present in the porous pipe or on the process for manufacturing the porous pipe. Examples of suitable blowing agents include volatile, e.g., low molecular weight, hydrocarbons such as propane, inert gases such as argon, nitrogen, and the like, water and mixtures thereof. Because of its nature, availability and effectiveness, water is by far the preferred blowing agent.

Any suitable solid blowing agent carrier material may be employed. This carrier should be capable of associating, e.g., physically combining with, the blowing agent so as to hold the blowing agent or a major portion thereof until such time as the conditions in the extruder assembly 18 force the release of the blowing agent from the carrier. Examples of useful solid blowing agent carriers include, molecular sieves, in particular zeolitic molecular sieves, crystalline and amorphous inorganic oxides, clays, organic polymeric materials, vermiculite, diatomaceous earth and mixtures thereof. It should be noted that the composition of the solid blowing agent carrier is different from that of either the elastomer particles or the binder. At least a major portion of the blowing agent may be adsorbed onto the solid carrier. One particularly useful solid carrier includes one or more synthetic zeolitic molecular sieves which include pores capable of adsorbing water. Another particularly useful solid carrier includes one or more synthetic ion exchange resins, such as those described elsewhere herein. Mixtures of more than one solid carrier may be employed.

The amount of blowing agent included with the solid blowing agent carrier should be such as to provide the desired amount of porosity in the final porous pipe. In many instances, where water is used as the blowing agent, the amount of water associated with the solid carrier is preferably in the range of about 0.05% to about 1%, more preferably about 0.1% to about 0.5%, by weight of the total mixture leaving mixer 14.

Mixer 14 may be of any suitable configuration and construction. In order to control the amount of blowing agent in the system it is preferred that mixer 14 be sealed from the surrounding atmosphere during the mixing operation. A particularly useful arrangement is to have mixer 14 rotate or tumble about an axis during the mixing operation. This has been found to provide a substantially uniform mixture of elastomer particles, binder and solid blowing agent-containing carrier.

After this mixture is obtained, it is transferred via line 42 into feed hopper 16, which is also preferably sealed from the surrounding atmosphere to control the amount of blowing agent in the mixture.

Feed hopper 16 feeds the mixture to extruder assembly 18, which includes an extruder barrel 44, an extruder screw 46 which is powered by motor 48 and an extruder die 50. The extruder barrel 44 is heated, e.g., by any suitable means, to temperatures which provide for the production of the porous pipe through the extruder die 50. Such heating means may be electric resistance heating, a circulating liquid heat transfer medium, combinations of these and the like. In one particularly useful embodiment, the extruder barrel 44 is approximately 10 feet in length. The extruder screw 46 runs from motor 48 to the end of barrel 44 which is adjacent to extruder die 50. Screw 46 is configured so that as it is rotated it provides a substantially uniform mixture of the material fed from feed hopper 16 and further urges this substantially uniform mixture toward and through extruder die 50.

Extruder die 50 is configured so as to provide a pipe or tube configuration of the mixture as it is extruded through extruder die 50. The hot tube, shown at 51 in FIG. 1, is allowed to "snake out" of the extruder die 50 under substantially no tension. In other words, substantially the only force on hot pipe 52 urging hot pipe 51 out of extruder assembly 18 is the force created by motor 48 and screw 46 to urge the mixture through extruder die 50. It has been found that having substantially no tension on hot pipe 51 provides for improved uniformity in the porosity and for improved strength of the final porous pipe 28 along its length.

Hot pipe 51 is directed into cooler assembly 20 so that it can be cooled and its structure can be set. Cooler assembly 20 includes a tank 52 including a quantity of chilled water 54 and a number of rollers 56 which are attached to the top of tank 52. The water 54 in tank 52 may be associated with a circulating system to provide a relatively constant temperature water in tank 52. The temperature of the water 54 in tank 52 is chilled, preferably in the range of about 35° F. to about 40° F., to provide sufficient cooling for hot pipe 51. The length of tank 52 in one particular embodiment is about 30 feet. The rollers 56 come in contact with the pipe as it traverses the tank 52 and act to facilitate orderly movement of the pipe through tank 52.

The cooled pipe 58 exits tank 52 and passes onto conveyor 22. The cooled pipe 58 then passes between nip roller 24 and conveyor 22 which together are adjusted to provide for controlled movement of the cooled pipe 58 without applying any substantial tension to the cooled pipe 58 or to the hot pipe 51. After passing between nip roller 24 and conveyor 22, the porous pipe 28 is wound around spool 26 and is ready for shipment and/or use, as desired.

As shown in FIG. 2, porous pipe 28 includes an outer wall 60, and an inner wall 62 which defines an inner, longitudinally extending open space 64 through which fluid can be passed. In a particularly useful embodiment, the thickness of the porous pipe 28, i.e., the shortest straight line distance between outer wall 60 and inner wall 62, is greater than that of conventionally produced porous pipe.

In a particularly useful embodiment, the wall thickness is at least as great as the cross-sectional diameter of the open space 64. Such relatively thick walled porous pipe have been found to provide substantial advantages. For example, both the inner wall 62 and the outer wall 60 have increased smoothness. Thus, with regard to inner wall 62, less pressure drop is apparent over the length of porous pipe 28. With respect to outer wall 60, porous pipe 28 has a more pleasing appearance. In addition, the relatively thick wall porous pipe 28 is stronger and a more uniform porosity along the length of such relatively thick porous pipe 28 is provided.

FIG. 3 illustrates an alternate porous pipe producing system, shown generally at 110. Except as expressly stated below, porous pipe producing system 10 and alternate porous pipe producing system 110 are structured, operate and function in substantially the same manner. Components of alternate porous pipe producing system 110 which correspond to components of porous pipe producing system 10 are given corresponding reference numerals increased by 100.

The primary difference between systems 10 and 110 is in the structure of extruder assemblies 18 and 118. In particular, a lead feed assembly 70 is provided in association with extruder die 72 which is positioned in place of extruder die 50. Lead feed assembly 70 provides lead wire to extruder die 72 which is configured to accept lead wire from lead feed assembly 70 and to incorporate such lead wire into the hot pipe 74 which "snakes out" of extruder die 72. The porous, lead containing pipe 76 is ultimately wound on spool 126.

As shown in FIG. 4, lead containing porous pipe 76 has a somewhat irregularly shaped cross-section. Pipe 76 includes an outer wall 78 and a first inner wall 80 which defines the open space 82 through which fluid can be passed. The lead wire 84 is also shown in FIG. 4 and runs the entire length of pipe 76. Lead wire 84 is completely surrounded by the solid material making up lead porous pipe 76. Lead wire 84 functions to increase the weight or ballast of pipe 76 so that it may be submerged in water, as desired. Pipe 76 is particularly useful in applications to aerate bodies of water in which the pipe containing the aeration fluid must be submerged in the water.

The following non-limiting examples illustrate certain embodiments of the present invention.

EXAMPLE 1

A length of porous pipe was prepared from the following materials: 33 pounds of crumb rubber particles, from discarded tires after metal removal, sized to pass through a 60 mesh (U.S.) screen; and 16.5 pounds of low density polyethylene, sold by DuPont under the trademark 20-20, in the form of spheres having diameters of about 0.1 to about 0.2 inch. The density of this polyethylene was 0.91 gm/cc.

The crumb rubber was dried in a heated oven at a temperature of about 350° F. for about 2 hours to dry this material so that it became substantially anhydrous. This dried crumb rubber and the polyethylene were then introduced into a sealed vessel which was capable of being rotated.

In a separate vessel, 0.6 pounds of a synthetic resin comprising a styrene (polystyrene)/p-divinyl benzene copolymer resin (known as an ion exchange resin), sold by Rohm and Haas under the trademark Amberlite IR-120 Plus, was combined with 0.25 pounds of liquid water. The resin was in the form of particles believed to have diameters of about 0.001 to 0.01 inch. Although the resin particles were wet to the touch, about 90% or more of the water was adsorbed or otherwise combined onto the resin.

This water laden resin was introduced into the sealed vessel with the crumb rubber and the polyethylene. After these materials were introduced, the sealed vessel was rotated or tumbled to provide a substantially uniform mixture. After this mixing operation, the mixture was transferred to an extruder feed hopper, which was sealed from the surrounding atmosphere.

The extruder employed was a conventional auger-type machine which was electrically heated to provide the desired temperature in the barrel or chamber of the extruder. The extruder screw was motor driven. The temperature in the barrel of the extruder was maintained at 300° F., which the temperature of the die was 290° F. The die was configured to produce a pipe having an outside diameter of 0.75 inch and an inside diameter of 0.375 inch. Except for the die opening, the barrel of the extruder, was sealed from the surrounding atmosphere.

The mixture from the extruder feed hopper was fed into the extruder barrel and the extruder screw speed was set to produce 1100 linear feet of hose per hour. This hose was allowed to "snake out" of the extruder die. That is, substantially no tension was exerted on the hose to pull it through the extruder die. Once the hose formed and passed out of the extruder, it was submerged in a chilled water bath held at about 40° F. to cool the hose. After cooling, the hose moved on a conveyor belt and under a top roller which was spaced apart from the conveyor so as to contact the hose on the conveyor. The distance or nip between the conveyor and the top roller was set to insure positive movement of the hose away from the extruder without applying any substantial tension force on the hose to pull the hose from the extruder. The cooled, flexible hose was then wound around a spool.

Several 50 foot lengths of this hose were tested for porosity by passing water through the inner, open space of the hose and measuring the amount of water passing through the hose wall.

Each length of hose permitted 1.1 gallons of water per minute per foot of hose to pass through the hose wall. These results indicated that the hose produced was porous and was effective in underground irrigation service. In addition, these results indicated that the hose produced had substantially uniform porosity. For longer lengths of hose, the difference in the amount of water passing through the hose at different points along the length of the hose is accounted for by the pressure drop along the length of the hose due to water flowing through the porous wall of the hose, rather than by differences in porosity of the hose along its length. The dimensions, configuration and porosity of the hose is preferably predetermined and/or controlled to meet the particular leak rate, pressure, and length of run requirements of the particular application involved.

The substantially uniform porosity of the hose is very advantageous since this feature allows the user of the hose to accurately predetermine the water flow through the hose at various distances from the water source.

EXAMPLE 2

Example 1 was repeated except that no water laden resin was used.

The polyethylene employed included a very small, and substantially fixed, amount of material which formed gas at the conditions in the extruder barrel and escaped from the hose as it passed through the extruder die.

The hose produced was tested for porosity and had a very limited amount of porosity, believed to be the result of the gas produced from the polyethylene in the extruder and escaping from the hose.

EXAMPLE 3

Example 1 was repeated except that twice as much water laden resin was used.

The hose produced was tested for porosity. As with the hose produced in Example 1, this hose was found to have substantially uniform porosity along its length. The Example 3 hose had increased porosity relative to the Example 1 hose. The porosity results on the Example 3 hose indicated that this hose was effective for underground irrigation service.

Examples 1, 2 and 3 illustrate at least one further point. That is, the porosity of the porous hose produced can be controlled, e.g., from one point along its length to another point along its length, by controlling the amount of water (blowing agent) fed to the extruder. Thus, comparing Examples 1, 2 and 3, the porosity of the hose produced is directly proportional to the amount of water fed to the extruder.

EXAMPLE 4

Example 1 was repeated except that the extruder was fitted with a die which permitted a ¼ inch diameter solid, flexible lead rod to be embedded along the length of the porous pipe as the pipe was formed. The interior hollow space of the porous pipe had a diameter of 0.375. Because of the embedded lead rod, the porous pipe had a somewhat irregularly shaped and enlarged cross-section. The lead rod was substantially surrounded by the wall structure of the flexible porous pipe.

This lead-containing porous pipe was tested and found to be effective in underwater aeration service. Thus, the porous pipe allowed air to pass through its wall along the length of the pipe. Because of the lead rod, the porous pipe was able to be submerged in water and remained submerged in water as air was being dispersed through the wall of the porous pipe. Also, because of the relative flexibility of the lead rod, the overall structure, i.e., porous pipe plus embedded lead rod, maintained a good amount of flexibility so that it was easy to maneuver, even under water.

While this invention has been described with respect to various specific examples and embodiments, it is to be understood that the invention is not limited thereto and that it can be variously practiced within the scope of the following claims.

What is claimed is:

1. An article comprising a porous pipe having a length, a longitudinally extending open space and containing elastomer particles, binder component and a solid component having a composition other than said elastomer particles and said binder component, the porosity of said porous pipe being at least partially controlled by the amount of water disassociated from said solid component in the process of manufacturing said article; and a ballast member located at least partially within said porous pipe and acting to increase the weight of said article relative to a similar article without said ballast member.

2. The article of claim 1 wherein said ballast member is flexible.

3. The article of claim 1 wherein said ballast member is a lead wire.

4. The article of claim 1 wherein said ballast member is located substantially entirely within said porous pipe.

5. An article comprising a porous pipe having a length, a longitudinally extending open space and containing elastomer particles, binder component and a solid component having a composition other than said elastomer particles and said binder component, the porosity of said porous pipe being at least partially controlled by the amount of blowing agent disassociated from said solid component in the process of manufacturing said article; and a ballast member located at least partially within said porous pipe and acting to increase the weight of said article relative to a similar article without said ballast member.

6. The article of claim 5 wherein said ballast member is flexible.

7. The article of claim 5 wherein said ballast member is a lead wire.

8. The article of claim 5 wherein said ballast member is located substantially entirely within said porous pipe.

9. An article comprising a porous pipe having a length, a longitudinally extending open space and containing elastomer particles and binder component, said porous pipe having sufficient porosity to allow air from said longitudinally extending open space to pass through and out of said porous pipe during normal use conditions; and a ballast member located at least partially within said porous pipe and acting to increase the weight of said article relative to a similar article without said ballast member.

10. The article of claim 9 wherein said ballast member is flexible.

11. The article of claim 9 wherein said ballast member is a lead wire.

12. The article of claim 9, wherein said ballast member is located substantially entirely within said porous pipe.

13. The article of claim 9 wherein said porous pipe further contains a solid component having a composition other than said elastomer particles and said binder component, the porosity of said porous pipe being at least partially controlled by the amount of water disassociated from said solid component in the process of manufacturing said article.

* * * * *